United States Patent [19]
Daly et al.

[11] Patent Number: 4,774,574
[45] Date of Patent: Sep. 27, 1988

[54] ADAPTIVE BLOCK TRANSFORM IMAGE CODING METHOD AND APPARATUS

[75] Inventors: Scott J. Daly, W. Henrietta; Cheng-Tie Chen; Majid Rabbani, both of Rochester, all of N.Y.

[73] Assignee: Eastman Kodak Company, Rochester, N.Y.

[21] Appl. No.: 57,404

[22] Filed: Jun. 2, 1987

[51] Int. Cl.$^4$ .............................................. H04N 7/133
[52] U.S. Cl. .................................... 358/133; 358/138
[58] Field of Search ................................ 358/133, 138

[56] References Cited

U.S. PATENT DOCUMENTS 4,268,861  5/1981  Schreiber ........................... 358/138
4,302,775 11/1981  Widergren ......................... 358/136

OTHER PUBLICATIONS

"Adaptive Coding of Monochrome and Color Images", by Chen and Smith, IEEE Transactions on Communications, vol. COM-25, No. 11, pp. 1285-1292, Nov. 1977.

"A Visual Weighed Cosine Transform for Image Compression and Quality Assessment" by N. B. Nill, IEEE Transactions on Communications, vol. COM-33, pp. 551-557.

Primary Examiner—Howard W. Britton
Attorney, Agent, or Firm—John D. Husser

[57] ABSTRACT

In a method and apparatus for transmitting a digital image over a limited bandwidth communication channel, an image is block transformed to produce blocks of transform coefficients; the transform coefficients are quantized in accordance with a model of the visibility of quantization error in the presence of image detail; the quantized coefficients are encoded with a minimum redundancy code; and the coded, quantized transform coefficients are transmitted.

14 Claims, 10 Drawing Sheets

ADAPTIVE BLOCK TRANSFORM IMAGE CODING METHOD AND APPARATUS

RELATED APPLICATIONS

U.S. Ser. No. 057,066; filed June 2, 1987
U.S. Ser. No. 057,410; filed June 2, 1987
U.S. Ser. No. 057,413; filed June 2, 1987
U.S. Ser. No. 057,585; filed June 2, 1987
U.S. Ser. No. 057,595; filed June 2, 1987
U.S. Ser. No. 057,596; filed June 2, 1987

TECHNICAL FIELD

The present invention relates to block transform digital image compression and transmission methods and apparatus, and more particularly to such methods and apparatus exploiting characteristics of the human visual system for increased image compression.

BACKGROUND ART

It is well known to employ block transform coding of digital images for bandwidth compression prior to transmission over a limited bandwidth communication channel. In a typical prior art digital image compression and transmission system employing block transform coding (see U.S. Pat. No. 4,302,775 issued Nov. 24, 1981 to Widergren et al), the digital image is formatted into blocks (e.g. 16×16 pixels) and a spatial frequency transformation such as a discrete cosine transform (DCT) is applied to each block to generate 16×16 blocks of transform coefficients. Each block of transform coefficients is ordered into a one-dimensional vector such that the frequencies represented by the coefficients generally increase along the vector. The transform coefficients are quantized and coded using a minimum redundancy coding scheme such as Huffman coding, and run length coding for runs of coefficients having zero magnitude. The coded transform coefficients are transmitted over the limited bandwidth channel.

At the receiver, the image signal is decoded using operations that are the inverse of those employed to encode the digital image. This technique is capable of producing advantageously high image compression ratios, thereby enabling low bit rate transmission of digital images over limited bandwidth communication channels.

It has been suggested that further improvements in image quality, without increasing the low bit rates, or alternatively even lower bit rates with the same quality of image, may be achieved by weighting the quantization of the transformed coefficients in accordance with the sensitivity of the human visual system to spatial frequencies (see "A Visual Weighted Cosine Transform for Image Compression and Quality Assessment" by N. B. Nill, IEEE Transactions on Communications, Vol. COM-33, pg. 551-557).

Block adaptive transform coding scheme have been proposed wherein transform blocks are sorted into classes by the level of image activity present in the blocks. Within each activity level, coding bits are allocated to individual transform coefficients with more bits being assigned to "busy" areas of the image and fewer bits assigned to "quiet" areas. (See "Adaptive Coding of Monochrome and Color Images" by W. H. Chen and C. H. Smith, IEEE Transactions on Communications, Vol. COM-25, No. 11, November 1977, pg 1285-1292). Although such block adaptive coding schemes achieve low overall bit rates, with low image distortion (in the sense of mean square error between the pixel values of the original image and the transmitted image) they fail to take into account the fact that transmission errors (e.g. quantization noise) in "busy" regions of the image are less visible than in "quiet" regions due to the phenomenon of frequency masking. U.S. Pat. No. 4,268,861 issued May 19, 1981, to Schreiber et al is an example of a non block transform image coding process that takes the frequency masking phenomenon into account. In the image coding system described by Schreiber et al, the image signal is separated into low, middle, and high frequency components. The low frequency component is finely quantized, and the high frequency component is coarsely quantized. Since the high frequency component contributes to image detail areas, the noise from the coarse quantization is hopefully less visible in such areas.

It is the object of the present invention to provide a block transform image compression technique that produces a further compression of the digital image. It is a further object of the present invention to provide a block transform image compression technique that takes advantage of the phenomenon of frequency masking, wherein noise is less visible in regions of an image having high frequency detail.

DISCLOSURE OF THE INVENTION

The objects of the present invention are achieved in a block transform image compression technique by accounting in the quantization step for the fact that the human visual system is less sensitive to noise in the presence of image detail. Accordingly, in a method or apparatus for coding and transmitting a digital image over a limited bandwidth communication channel, in a transmitter or transceiver, a two dimensional spatial frequency block transformation is performed on a digital image to produce blocks of transform coefficients. The transform coefficients are quantized in accordance with a model of the visibility of quantization noise in the presence of image detail. The quantized transform coefficients are encoded and transmitted. In the preferred mode of practicing the invention, the transform coefficients are quantized by arranging the coefficients from a block into a one dimensional vector in order of increasing spatial frequency. The coefficients in the vector are sequentially quantized starting with the coefficient representing the lowest frequency, by forming an estimate of the contrast of the image structure in the block from the previous coefficients in the vector, and determining the quantization for the current coefficient as the function of the contrast estimate. The function relates the contrast estimate to the visibility of quantization error in the presence of image detail having such contrast.

According to a further aspect of the present invention, image detail characterized by an edge separating uniform areas in a block is detected, and the quantization based upon contrast is disabled when such an edge is detected, thereby improving the performance of the technique. In the preferred implementation of the invention, the adaptive quantization is implemented by adaptive normalization followed by fixed quantization.

MODES OF CARRYING OUT THE INVENTION

Figure 1:
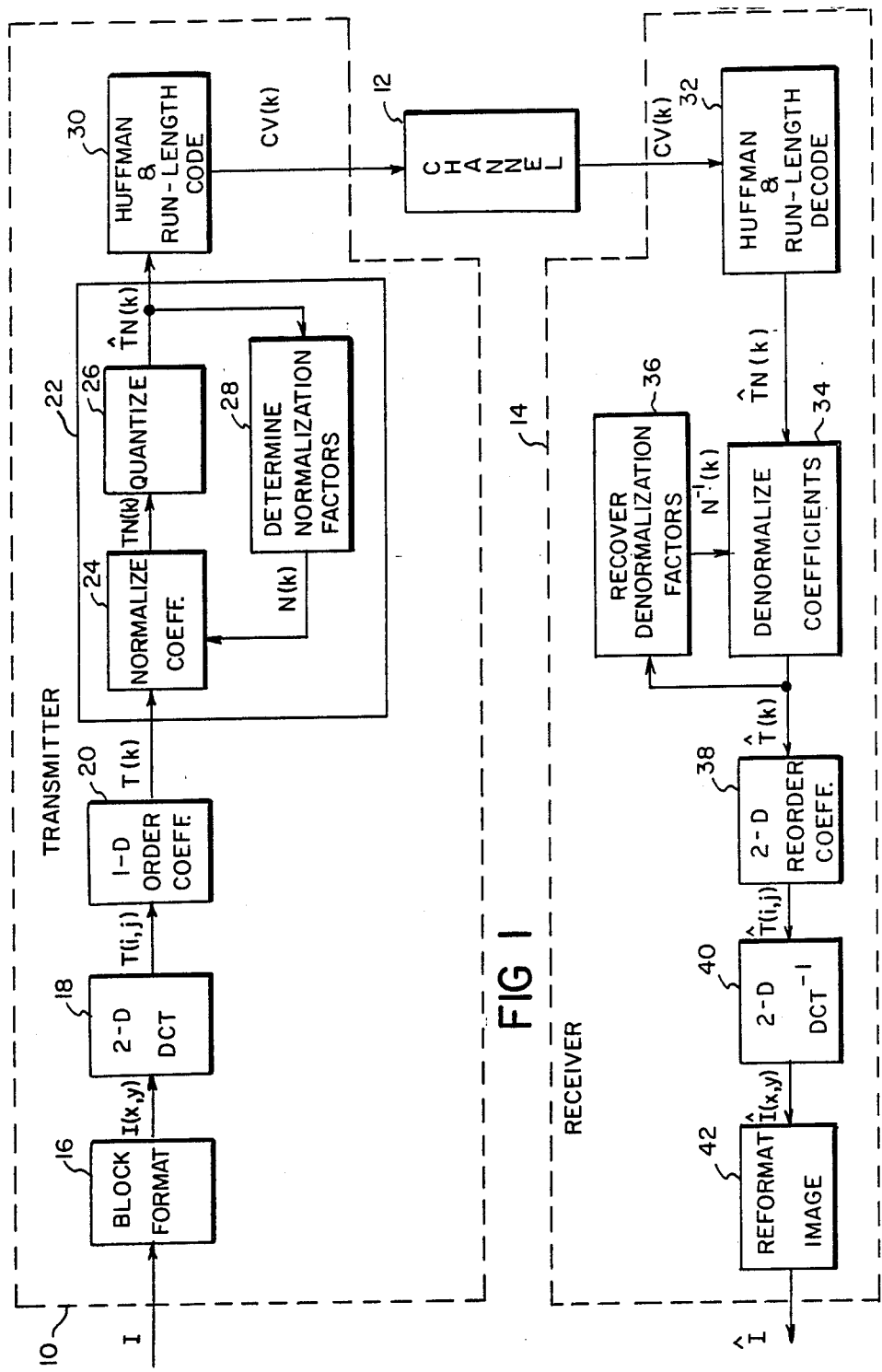
FIG. 1 is a block diagram showing a system for compressing and transmitting digital images according to the present invention.

Before describing the practice of the invention, it will be helpful to discuss the nature of the artifacts caused by DCT processing and how they arise. In DCT compression schemes of the type employing visually weighted quantization, the bit rate is reduced by effectively increasing the quantization intervals for the DCT coefficients until the quantization noise is just below the threshold of visibility. In practice, the actual quantization step remains constant for all coefficients but is effectively varied by a preceding normalization step which divides the coefficients by some number, referred to as the normalization factor. The result of the normalization step is then quantized, typically by rounding to the nearest integer. A higher normalization factor will result in a lower input range to the fixed quantizer, which in turn results in fewer output quantization levels. Fewer quantization levels over the coefficient's dynamic range will result in larger quantization intervals after an inverse normalization step has been performed at the receiver. The inverse normalization step is merely a multiplication by the same normalization value employed at the transmitter. Compression results from the subsequent use of Huffman coding for amplitudes of the coefficients which have reduced values due to the normalization process, and run-length coding for the coefficients which are quantized to zero.

Errors from the quantization process arise when the DCT coefficients are rounded to either the nearest higher quantization level or the nearest lower quantization level. The values of the DCT coefficients basically represent the amplitudes of spatial frequency components of an image block, wherein the absolute value is proportional to image contrast, while the sign of the coefficient determines the phase. Thus, the rounding process in the quantization step results in the possibility that a spatial frequency component may have an incorrect contrast. The quantization process employed in the following description will be rounding to the nearest quantization level, although other types of rounding, such as truncation (or rounding down), may be employed.

Nearest level rounding can produce several results. If the nearest level happens to be lower than the coefficients original value, the spatial frequency component represented by the coefficient will have a reduced contrast. If the quantized value is higher than the original value, the spatial frequency component will appear with a higher contrast. With nearest level rounding type quantization, the maximum error is bounded by half the quantization interval. If the error is large enough, the spatial frequency component becomes clearly visible, appearing to be superimposed over the original image block. When many coefficient values are incorrect, the appearance of the errors approaches that of white noise.

The quantization errors in the DCT coefficient values result in spatial frequency components having either too high or too low a contrast, with the maximum contrast error bounded by one half the width of the quantization interval. The most straightforward way of applying human visual data to the quantization process is to use the spatial frequency contrast sensitivity function (CSF) as described in the Nill article noted above. The CSF is derived by taking the inverse of the visual contrast threshold, which describes the contrast at which a particular spatial frequency becomes detectable. Using the CSF the effective quantization interval is allowed to be as large as possible without resulting in the visibility of quantization error. In implementing such a scheme, the normalization value for a DCT coefficient is made proportional to the inverse of the contrast sensitivity for the spatial frequency represented by The DCT coefficient. It is advantageous to perform these calculations in a nonlinear visual space for amplitude of the code values of the image. Psycho-physical research indicates that this space is very close to a one third power function of display intensity for average viewing conditions.

The visual weighting of the coefficients as described above is valid for situations which are consistent with the experiments employed to measure the CSF, which also happens to be the most critical viewing conditions: i.e. when the spatial frequency component error appears in an otherwise uniform field. However, the human visual contrast sensitivity to different spatial frequencies in the presence of image structure is much less than that in the presence of a uniform field. This property is referred to as visual masking and is utilized in the present invention to improve the image quality or reduce the bit rate in a block transform image compression technique. Since the spatial frequency contrast errors are occurring in the presence of the original image, their visibility is masked by the inherent image structure. Thus, the quantization errors can be allowed to be larger than that ascertained merely from the CSF, and if performed correctly no new visible errors will be introduced, yet the bit rate can be reduced due to the larger quantization intervals.

Figure 3:
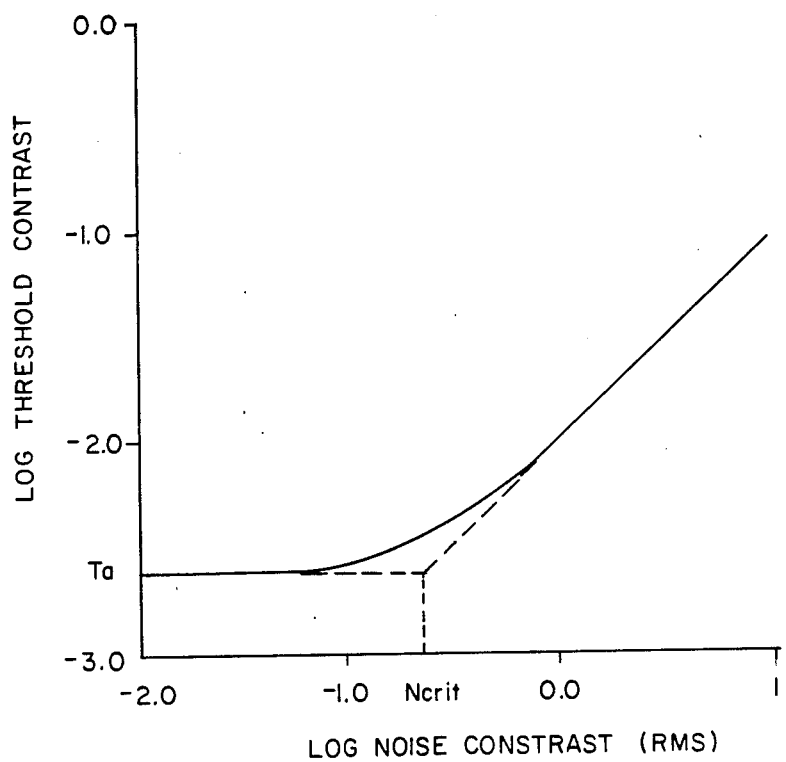
FIG. 3 is a graph useful in describing the concept of visual masking.

The dependence on the visibility of image structure in the presence of noise is well studied. FIG. 3 is a graph of psycho-physical experimental data showing the affect on the threshold visibility of a single spatial frequency in the presence of white noise, plotted on a log—log scale. The ordinate of FIG. 3 is the log threshold contrast for visibility of the spatial frequency, and the abscissa of FIG. 3 is the log RMS contrast of the noise. As shown in FIG. 3, the threshold contrast $T_a$ for visibility of a spatial frequency is not substantially affected until the noise contrast reaches a critical value $N_{crit}$, above which the effect of noise on the visibility threshold is essentially a straight line having a slope of one in log—log space.

This general linear relationship has been found to hold for all spatial frequencies in the presence of noise, although the threshold contrast $T_a$ and critical noise value $N_{crit}$ varies somewhat as functions of spatial frequency.

The results from other psycho-physical experiments on the effects of low pass noise having a pass band with a cut off less than the spatial frequency under consideration and high pass noise having a pass band with a cut off higher than the spatial frequency under consideration on the visibility of spatial frequencies shows that the masking effect increases as the cut off frequency of the pass band of the noise approaches the spatial frequency under consideration, and a maximum occurs when the cut off frequency of the noise is equal to the spatial frequency for which the visibility threshold is being measured. At this point, the visibility of the spatial frequency in the presence of low pass or high pass noise depends upon the magnitude of the noise in the same manner as shown in FIG. 3. The experiments also show that the effects on visibility of a spatial frequency are greater in the presence of low pass noise than in the presence of high pass noise.

By reversing the roles of signal and noise in the above description, it can be appreciated how the visibility of quantization noise in an image is masked by the presence of image detail. The present invention takes advantage of this fact in a block transform digital image coding scheme to significantly improve the amount of compression achievable.

A block diagram of a system for compressing and transmitting a digital image according to the present invention is shown in FIG. 1. A transmitter 10 acquires a digital image from a source (not shown) such as an image sensor, film scanner or a digital image recorder. The digital image comprises for example 512×512 8-bit pixels. The transmitter 10 compresses and encodes the digital image, and supplies the encoded digital image signal to a limited bandwidth communication channel 12 such as a standard 3.3 khz bandwidth telephone line. The encoded digital image signal is received from the channel 12 by a receiver 14 that decodes the compressed digital image signal and reconstructs the digital image.

Transmitter 10

The transmitter 10 receives the digital image I and formats (16) the image into blocks I(x,y). The currently preferred block size is 16×16 pixels. A two-dimensional discrete cosine transform is performed (18) on each block to generate the corresponding block T(i,j) of transform (2 - D DCT) coefficients. Since the 2 - D DCT is a well known procedure, (see above referred U.S. Pat. No. 4,302,775) no further description will be given herein of the (2 - D DCT) operation. The transform coefficients T(i,j) for each block are ordered (20) into a one-dimensional array T(k) in order of increasing spatial frequency, for example by employing a zig-zag scan along diagonals of the block of coefficients.

Next, the coefficients are adaptively quantized (22) in accordance with the visibility of quantization noise in the presence of image detail within a block. According to the preferred mode of practicing the invention, the adaptive quantization (22) is accomplished by variable normalization (24) prior to a fixed quantization (26). Alternatively, a variable quantization could be employed. The transform coefficients T(k) are normalized by dividing each transform coefficient by a normalization factor N(k) as follows $$TN(k) = T(k)/N(k) \quad (1)$$

where TN(k) is the normalized transform coefficient value. The normalization factor N(k) is determined (28) as described below based on the visibility of quantization noise in the presence of image detail in the block. The normalized coefficients $\hat{T}N(k)$ are quantized (26) to form quantized coefficients $\hat{T}N(k)$. The quantized coefficients are encoded (30) using a minimum redundancy coding scheme to produce code values CV(k). A presently preferred coding scheme is a Huffman code with run-length coding for strings of zero magnitude coefficients. Since Huffman and run-length coding are well known in the art, (see above reference U.S. Pat. No. 4,302,775) no further description of the coding process will be given herein. The coded coefficients are transmitted over the channel 12 to receiver 14.

Receiver 14

The receiver 14 performs the inverse of the operations performed by the transmitter 10 to recover the digital image. The code values CV(k) are decoded (32) to produce normalized coefficients $\hat{T}N(k)$. The normalized coefficients $\hat{T}N(k)$ are denormalized (34) employing denormalization values $N^{-1}(k)$ that are the inverse of the normalization array N(k) employed in the transmitter to produce the denormalized coefficients $\hat{T}(k)$. Alternatively, the transform coefficients are denormalized by multiplying by the normalization coefficients N(k). The denormalization values $N^{-1}(k)$ are recovered (36) at the receiver from the coefficient values as described in more detail below.

The one-dimensional string of reconstructed coefficient values $\hat{T}(k)$ are re-formatted (38) into two-dimensional blocks $\hat{T}(i,j)$ and the blocks of coefficients are inversely transformed (40) into image values $\hat{I}(x,y)$. Finally, the blocks of image values are re-formatted (42) into the digital image $\hat{I}$.

Determination of Normalization Factors (28)

Since the transform coefficients T(k) to be normalized are arranged in increasing order of spatial frequency, in a sequential processing scheme, information about the values of all the previous coefficients which represent lower spatial frequencies, is available when processing any given coefficient in the one dimensional array. The image detail represented by the previous coefficients is the low pass image detail. In analogy to the results of the psycho-physical experiments noted above, the quantization noise in coefficient T(k) represents the signal, and the previous coefficients T(0)→T(k−1) represent the low pass noise (image detail) masking the visibility of the quantization noise.

The RMS contrast of the low pass image detail $c_{rms}$ is represented by:

$$c_{rms} = \sqrt{\sum_{i=1}^{k-1} TN(i)^2} \quad (2)$$

The amplitude of this rms contrast will determine the visibility threshold of the quantization error for quantized coefficient $\hat{T}N(k)$.

Based on typical display conditions (1.0 m viewing distance and a pixel spacing of 0.54 mm/pixel) the 16×16 pixel subimage blocks will subtend a 0.5 by 0.5 degree visual field. It is believed, as the result of experiment, that the masking effect does not extend uniformly over such a wide visual field. In fact, at as little as 0.4 degrees away from the site of image detail, the masking effect may be less than half the amount at the detail site. This impacts the determination of the normalization factors in that, when the detail in a subimage is not homogeneous, the masking factor determined from the previous coefficients may not be appropriate. An example would be a subimage block containing two uniform areas widely of differing grey level. The high contrast edge produced by this discontinuity between grey levels will result in relatively high amplitude lower frequency transform coefficients for the block. The values of these coefficients would indicate a large amount of image detail which would result in very coarse quantization of the higher frequency DCT coefficients. This course quantization will result in the presence of significant quantization error, which would be predicted to be masked by the image detail. However, quantization errors in the two smooth areas are not entirely masked by the presence of the edge, due to the limited local extent of the masking effect. A similar problem occurs in blocks containing an area of image texture and a smooth area for the reason noted above. Observations of compressed and decompressed images using the adaptive quantization technique described above indicates that the extent of the masking effect is substantially less than 0.5°.

To avoid problems caused by sharp edges between uniform areas, adaptive normalization is not practiced on the first m(e.g. 10) coefficients in the block. The normalization factor for these coefficients is set to a predetermined value (e.g. 1) and the summation process is started at the m+1$^{st}$ coefficient. The detail estimate $c_{rms}$ is started with the m$^{th}$ coefficient value, such that:

$$c_{rms} = \sqrt{\sum_{i=m}^{k-1} (T_i)^2} \quad . \quad (3)$$

Similarly, in recovering the coefficients at the receiver, the first m coefficients are denormalized with the predetermined constant, and the detail estimate $c_{rms}$ is begun at the m$^{th}$ coefficient value.

Since an edge produces energy in the transform coefficients in approximate proportion to the inverse of the spatial frequency represented by the coefficient, for very high contrast edges the high frequency coefficients may still contribute sufficient value to the detail estimate $c_{rms}$ to produce an incorrectly calculated masked effect. According to a further refinement of the present invention, this situation is accounted for by employing an edge detector prior to determining the normalization factor, and disabling the adaptive normalization when an edge is detected. A simple edge detector is implemented by summing the absolute values of the first m coefficients and comparing the sum to a predetermined value $C_1$ to determine whether an edge is present. When a high contrast edge is detected, the adaptive normalization is disabled for the block by setting all of the normalization factors equal to one.

A more sophisticated edge detector may be implemented at the cost of increased computation complexity by calculating the ratio of the variance of the low frequencies in the image block to the variance of all the frequencies in the block. A high ratio will indicate the presence of a high contrast edge. The calculation of the variance ratio may occur in parallel with the calculation of the DCT, and the results employed when determining the normalization factors.

Figure 2:
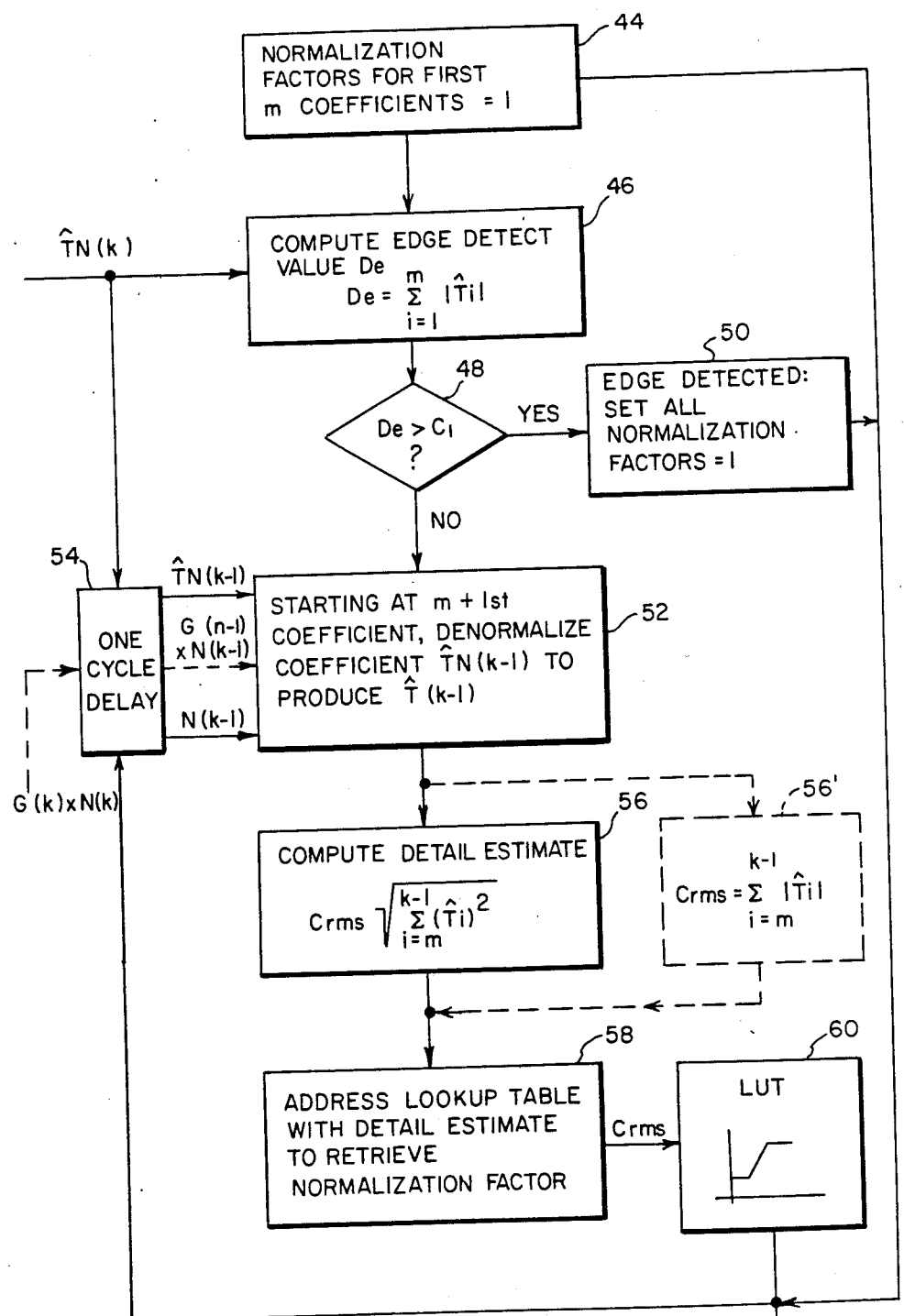
FIG. 2 is a block diagram showing further details of the determination of normalization factors in FIG. 1.

Referring now to FIG. 2, the steps involved in determining the normalization factors N(k) will be described in more detail. The normalization factors for the first m coefficients are set equal to one (44). An edge detect value $D_e$ is computed (according to the simple method described above) by summing the absolute values of the first m coefficients (46). The value of $D_e$ is compared to the predetermined threshold $C_1$ (48). If the edge detect value is greater than the threshold $C_1$, an edge has been detected, and further adaptive normalization is disabled by setting the remainder of the normalization factors equal to one (50).

If the edge detect value is less than or equal to the predetermined constant $C_1$, subsequent coefficients are denormalized (52). This is done to enable the normalization factors to be recovered at the receiver without error. Using the normalized quantized coefficients at the transmitter to determine the normalization factors insures that the values later employed at the receiver will be identical. The coefficients are processed sequentially, and the coefficient $\hat{T}N(k-1)$ to be denormalized is held over from the previous processing cycle by delay (54). A detail estimated $c_{rms}$ is computed (56) according to equation (3) above. The detail estimate $c_{rms}$ is employed (58) to address a look up table (60) that contains the normalization factor values N(k). The normalization factor N(k) is employed to normalize the coefficient T(k) prior to quantization and will be employed in the next cycle to denormalize the quantized coefficient $\hat{T}N(k)$. Denormalization factors stored in look up table (60) are generated empirically from the relationship shown in FIG. 3.

Although the square root of the sum of the squares of the coefficient values is the preferred estimate of image detail for selecting the normalization factors, the square and square root operations are computationally intensive. To provide a more computationally efficient process that can be accomplished in less time by less sophisticated hardware (e.g. a microprocessor) with only a slight reduction in compression efficiency, the sum of the absolute values of the denormalized quantized coefficients may be employed as the detail estimate $c_{rms}$. This alternative method of forming the detail estimate is shown in dashed box (56') in FIG. 2.

Figure 4:
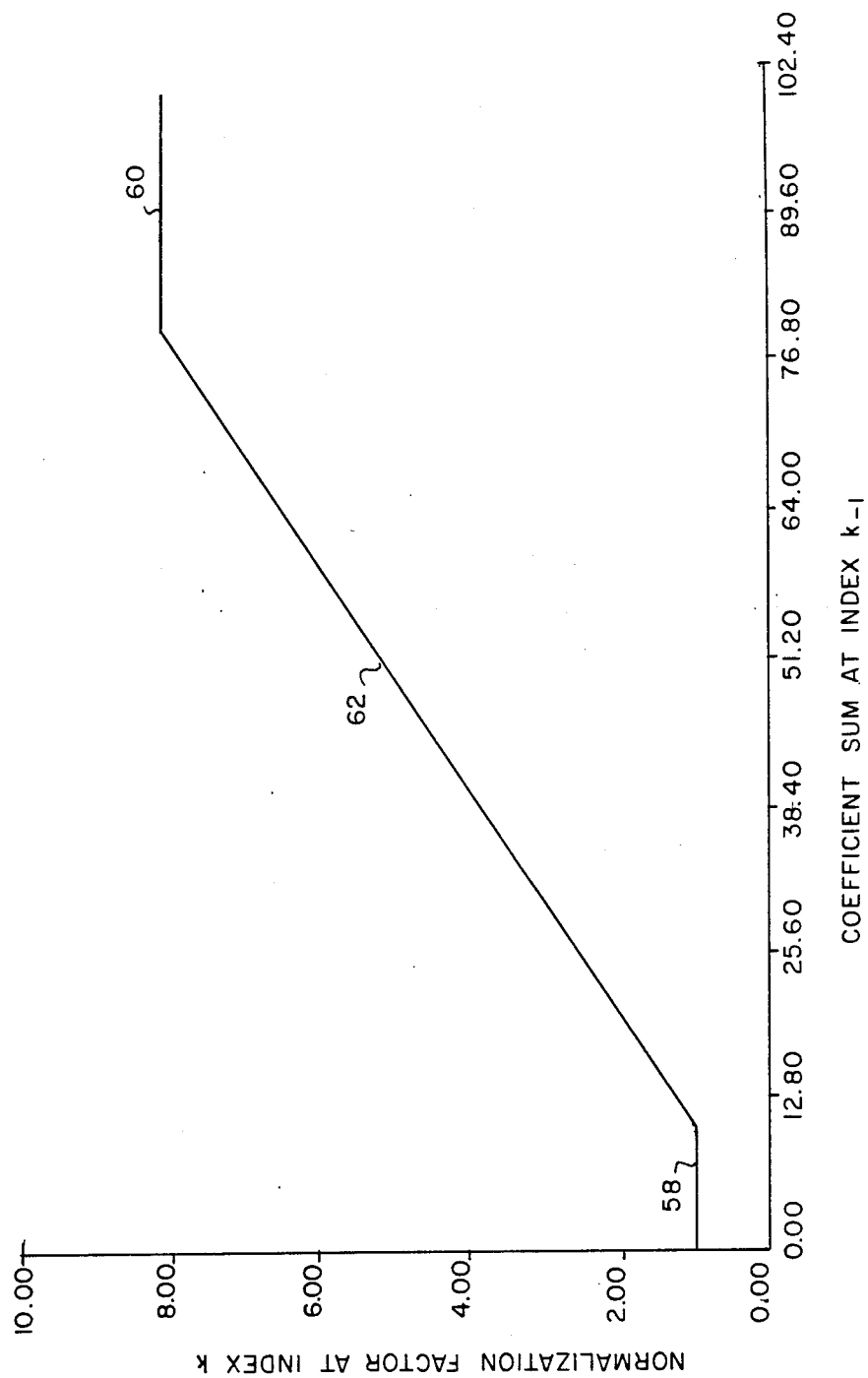
FIG. 4 is a graph of the values stored in the look up table shown in FIG. 2.

FIG. 4 shows a plot of the actual values used as normalization factors N(k) for coefficients T(k) versus the sum of the absolute values of the coefficients from m to k−1, where m is 10. The lower flat portion 58 of the curve in FIG. 4 reflects the threshold portion of the curve in FIG. 3. The upper flat portion 60 of the curve in FIG. 4 is imposed by the limited number of bits (e.g. 10) used in the code word to define the normalization factor N(k). The slope of one in the sloping portion (62) of the curve matches the slope of the curve in FIG. 3. The required dynamic range of the sloping portion 62 of the curve in FIG. 4 was determined empiricalliy by observing the effects of compression and decompression on an assortment of digitized photographic images. A dynamic range was chosen consistent with the number of bits in the code word to produce maximum image compression without introducing visible quantization noise in the processed image.

Recovery of the Denormalization Factors (36)

The recovery of the denormalization factors $N^{-1}(k)$ at the receiver duplicates the process of their generation at the transmitter, and will now be described with reference to FIG. 5. An edge detect value $D_e$ is computed (64) by summing the absolute values of the first m coefficients. The edge detect value is compared with the predetermined threshold $C_1$ (66) to determine if an edge is present in the subportion of the image. If an edge is detected, all of the denormalization factors are set equal to one (68). If an edge is not detected, denormalization factors are determined for subsequent coefficients by forming a detail estimate (72) $c_{rms}$ for each coefficient. The detail estimate is the square root of the sum of the squares of previous denormalized coefficient values from the $m^{th}$ coefficient value to the immediately previous value ($k-1^{st}$). A running sum is accumulated in the previous denormalized value is supplied via a one cycle delay (74). The detail estimate is employed to address (76) a look up table (78) that contains the denormalization factors, which are the reciprocals of the normalization factors employed in the transmitter 10. Alternatively, the values stored in look up table (78) may be identical to values stored in the look up table (60) in the transmitter, and the denormalization may be implemented by multiplying by the normalization factors.

Figure 5:
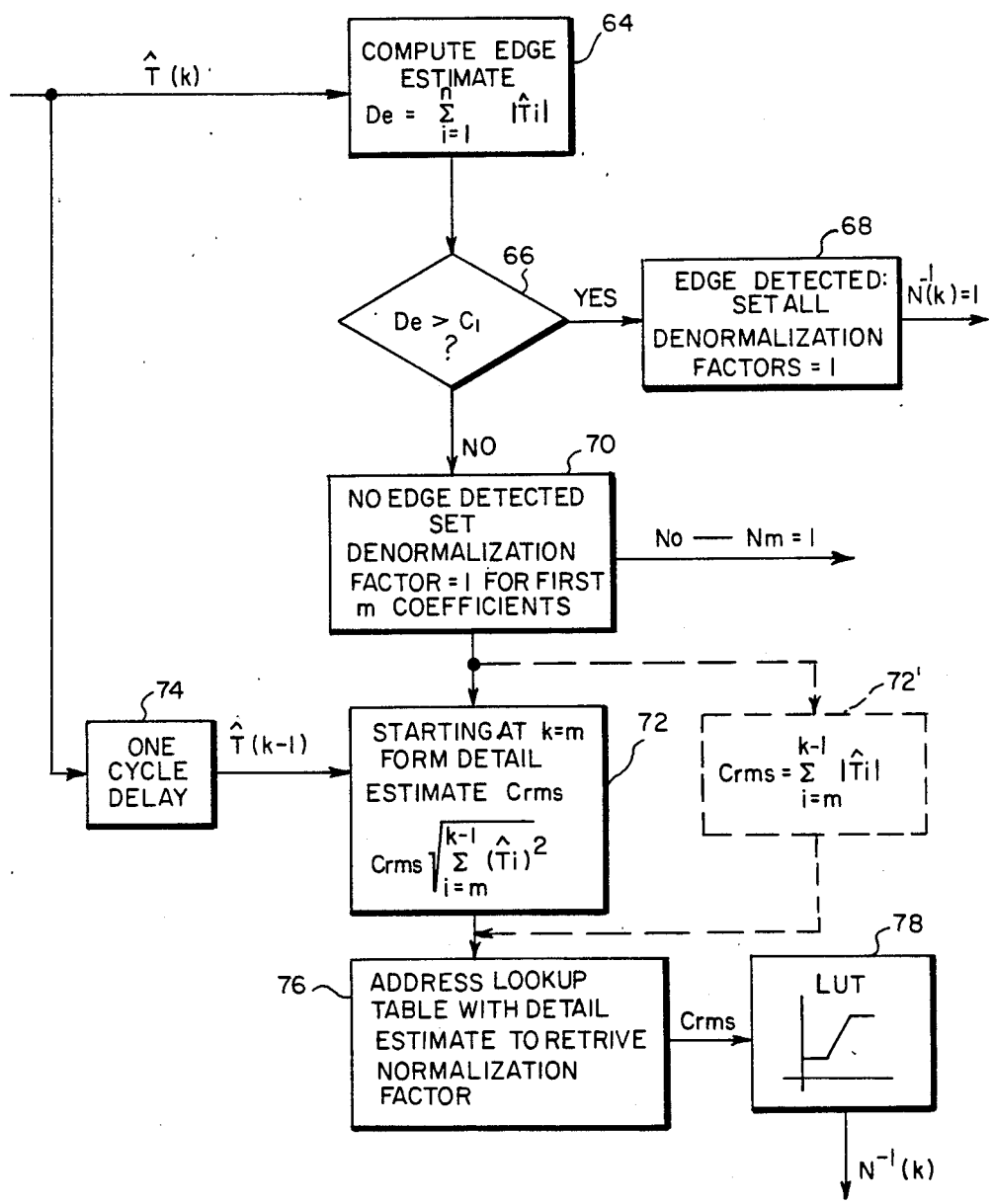
FIG. 5 is a block diagram showing further details of the recovery of normalization factors in the receiver shown in FIG. 1.

Of course, if the more computationally efficient procedure using the sum of the absolute values of the coefficient to compute the detail estimate is employed in the transmitter, the detail estimate will be likewise formed at the receiver, as shown in dashed block 72' in FIG. 5.

The block adaptive transform coding scheme according to the present invention can also be combined with a global visual weighting quantization scheme to produce even further improvements in compression ratio. In a global visually weighted quantization scheme, a global normalization array representing the relative human visual response to each of the spatial frequencies represented by the corresponding DCT coefficients is applied to all the blocks of the image.

An improvement to this visual weighting technique, wherein the reduced human visual response to diagonally oriented spatial frequencies is taken into account is disclosed in copending patent application Ser. No. 057,413 entitled "Digital Image Compression and Transmitting System Employing Visually Weighted Transform Coefficient Normalization" by the present inventors, filed on even date herewith.

Figure 6:
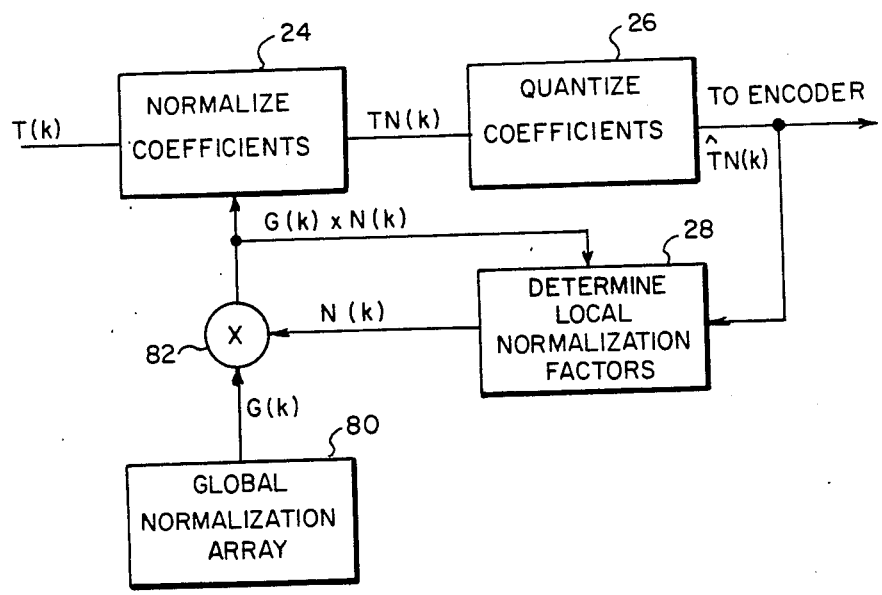
FIG. 6 is a block diagram showing how the block adaptive normalization according to the present invention is combined with global visual response normalization in the transmitter.

FIG. 6 illustrates the manner in which the human visual weighting technique is combined with the adaptive normalization technique in the transmitter. A global normalization array 80 contains normalization factors representing the relative human visual response to the spatial frequencies represented by the DCT coefficients. The local normalization factors based upon the image detail in the block are determined (28) as described above. The global normalization factor $G(k)$ for the $k^{th}$ coefficient is multiplied (82) by the local normalization factor $N(k)$, to produce the final normalization factor to normalize (24) the coefficient $T(k)$. The only change to the details of the computation of the local normalization factor $N(k)$ as described in FIG. 2 involves employing the final normalization factor $G(k) \times N(k)$ in the denormalization (52) of the coefficient. This slight change is indicated by dashed lines in FIG. 2.

Figure 7:
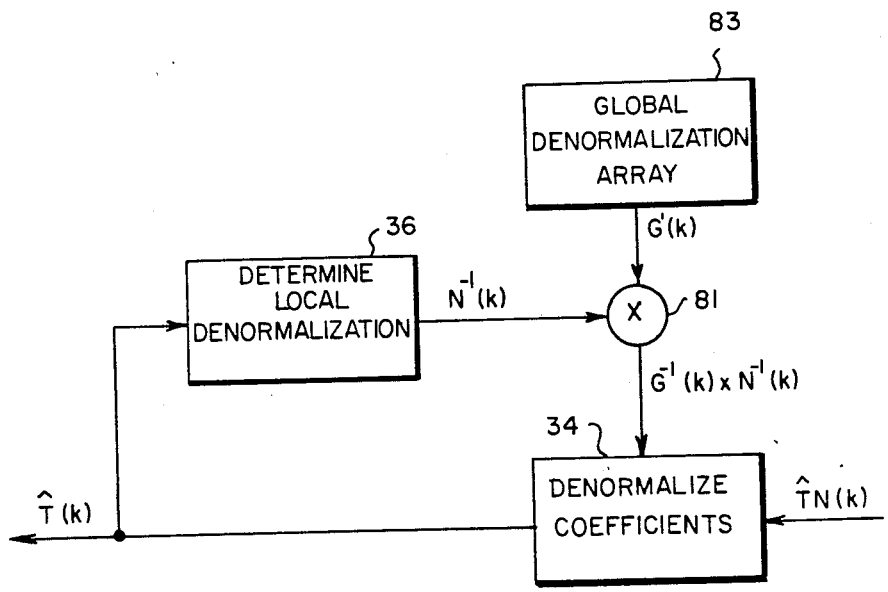
FIG. 7 is a block diagram showing how a receiver denormalizes the coefficients generated according to the process shown in FIG. 6.

The recovery of the final normalization factor at the receiver is shown in FIG. 7. After the local denormalization factor $N^{-1}(k)$ is determined (36) it is multiplied (81) by a global denormalization factor $G^{-1}(k)$ from a global denormalization array (83). The global denormalization array values are the reciprocals of the global normalization values. No modification to the details for determining the local denormalization factors as shown in FIG. 5 are required.

Working Example

Figure 8:
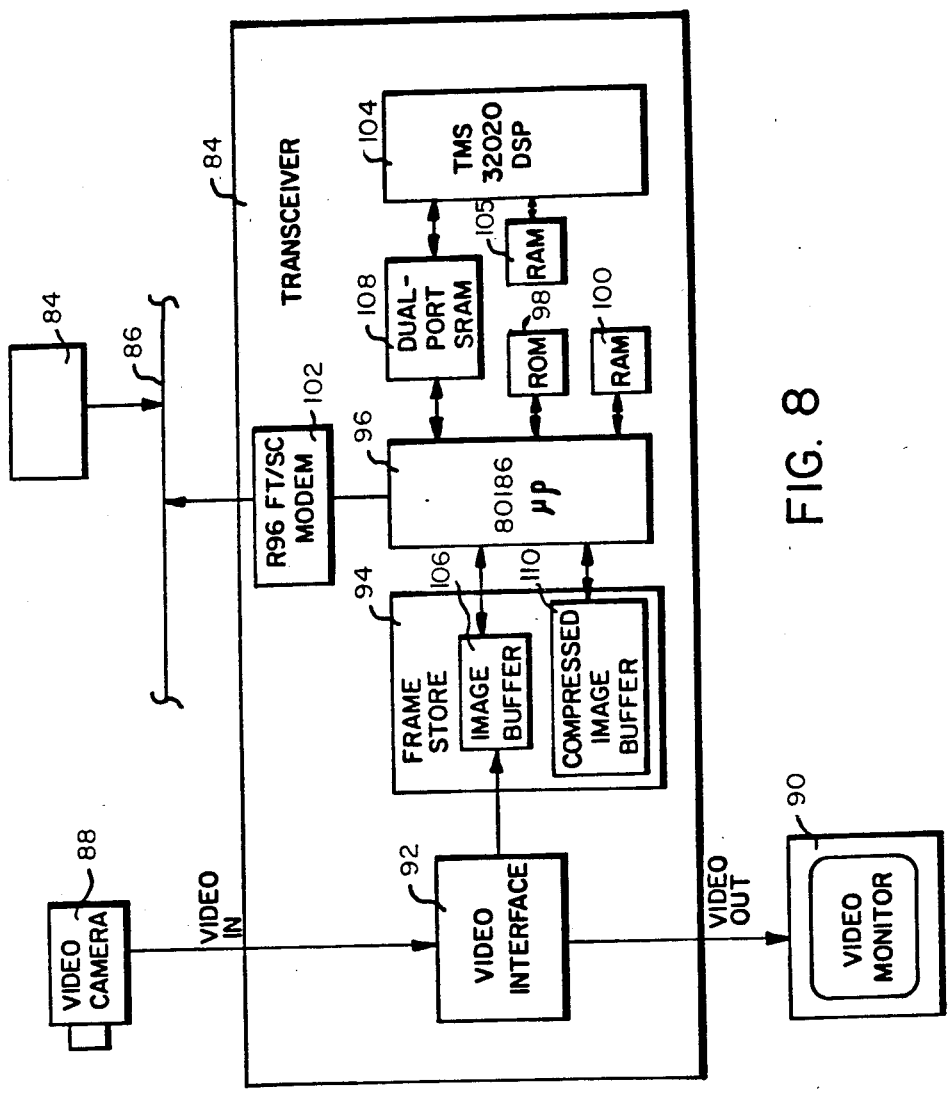
FIG. 8 is a schematic diagram of a communication system employing transceivers useful according to the present invention.

Referring now to FIG. 8, a preferred implementation of the present invention in a still video communication system will be described. The system includes two or more transceivers 84 coupled to a telephone transmission line 86. Each of the transceivers 84 is connected to a video signal source such as a video camera 88, and to a video display such as a video monitor 90. Each transceiver 84 contains a standard video interface 92 that receives video signals from the video source, digitizes the signals, and supplies the digital image signals to a digital frame store 94. The video interface 92 also receives digital image signals from the digital frame store 94 and produces a standard video signal for display on the video monitor 90.

Each transceiver is controlled by an Intel 80186 microprocessor 96 having conventional ROM 98 and RAM 100 for storing the control programs and temporary storage of data respectively. The microprocessor 96 performs the run-length and Huffman coding and decoding, and the block adaptive normalization and denormalization on the DCT coefficients. The coded DCT coefficients are sent and received over a telephone line 86 via an R96 FT/SC modem 102. The forward discrete cosine transforms DCT (in the transmitting mode) and reverse transforms (in the receiving mode) are performed by a TMS 32020 Digital Signal Processor 104 having a conventional RAM 105 for storing the DCT transform program.

In the transmitting mode, the microprocessor 96 retrieves one $16 \times 16$ block of digital image data at a time from an image buffer 106 in the digital frame store 94. The $16 \times 16$ block of digital image data is temporarily stored in a dual port SRAM 108, that is accessible by both the microprocessor 96 and the digital signal processor 104. The digital signal processor 104 performs the discrete cosine transform and returns the $16 \times 16$ block of transform coefficients to the dual port SRAM 108. The block of transform coefficients are then normalized and compressed (Huffman and run-length encoded) by the microprocessor 96. The compressed signal is stored in a compressed image buffer 110 in digital frame store 94 and transmitted at the data rate of the modem 102. This cycle is repeated on each block until the entire image has been compressed, and transmitted.

In the receiving mode, a compressed digital image is received via modem 102 and stored in compressed image buffer 110. One block at a time of compressed DCT coefficients is retrieved from the compressed image buffer 110 and denormalized and expanded by microprocessor 96. The expanded block of DCT coefficients is supplied to dual port SRAM 108. The digital signal processor 104 inversely transforms the coefficients to produce a $16 \times 16$ block of digital image values, which are temporarily stored in SRAM 108. Microprocessor 96 transfers the block of digital image values from the dual port SRAM 108 to image buffer 106. This cycle is repeated until the entire image has been received decompressed and stored in image buffer 106. The image is displayed as it is reviewed on the video monitor 90 via video interface 92.

Figure 9:
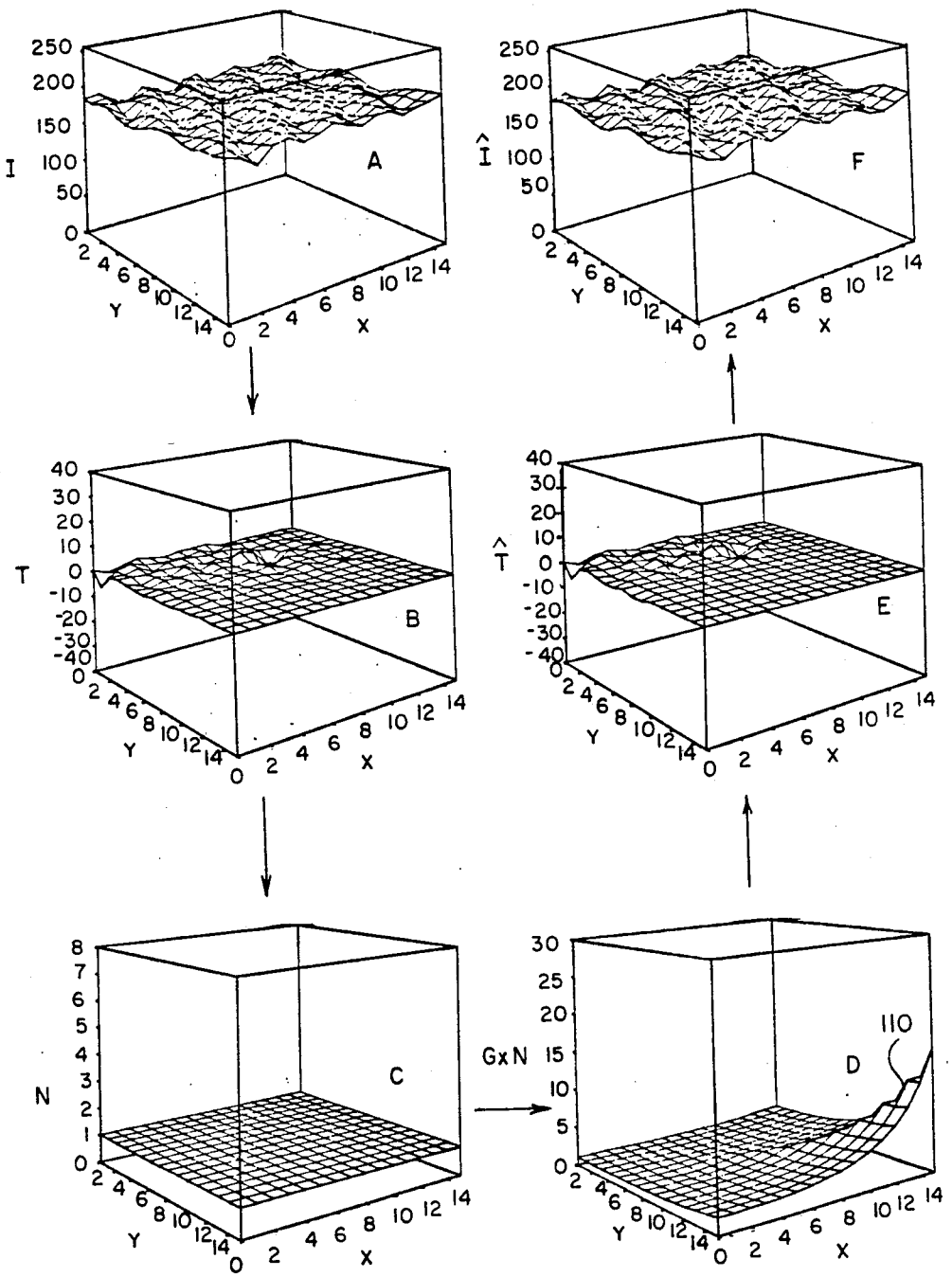
FIG. 9 is a set of graphs showing the processed values resulting from processing an image block having a low image activity according to the present invention.

The Digital Signal Processor 104 was programmed to implement the combination of block adaptive and global visual weighting described above. FIG. 9 shows the results of the processing steps for compression and reconstruction of a single 16×16 pixel image block having low amplitude detail. Although the image blocks were processed in linear array form, they are shown here as two dimensional arrays to aid in visualization of the processing. Block A in FIG. 9 shows the input image values I(x,y). Block B shows the values of the transform coefficients T(x,y). Block C shows the local normalization factors N(x,y) which are all ones in this case due to the low amplitude of the image detail. Block D shows the final normalization factors G(x,y) x N(x,y) comprising the adaptively determined local normalization factors N(x,y) times the global human visual response normalization factors G(x,y). Because the local normalization factors are all ones, block D is simply the global normalization array. The global normalization array employed here takes into account the reduced response of the human visual system to diagonally oriented spatial frequencies, hence the appearance of the diagonal ridge 110 in the two-dimensional plot of the normalization values. Block E shows the quantized and denormalized coefficient values T(x,y) as recovered at the receiver. Block F shows the reconstructed image block I(x,y) at the receiver.

Figure 10:
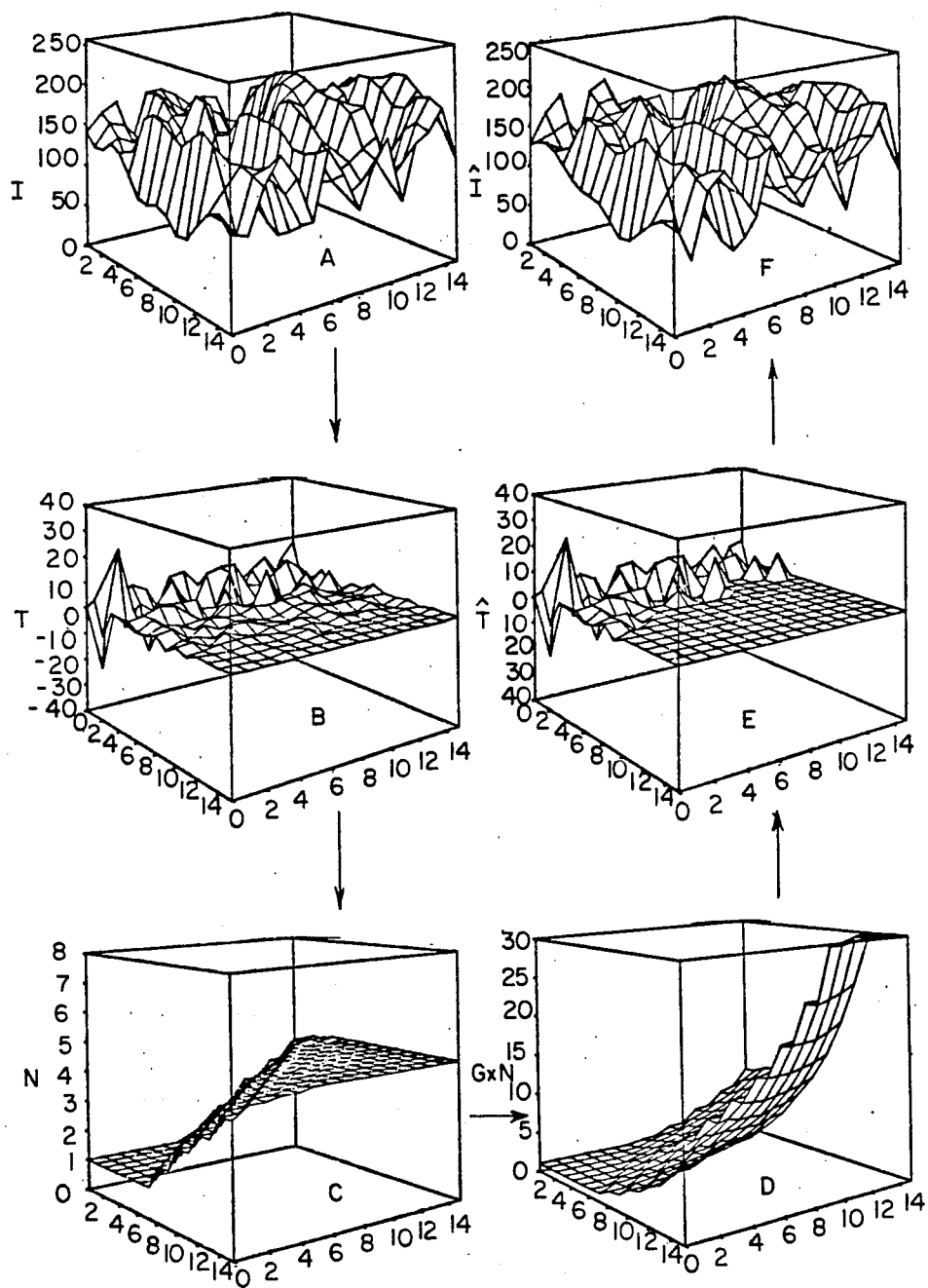
FIG. 10 is a set of graphs similar to those of FIG. 9, showing a block having high image activity.

FIG. 10 is a plot similar to FIG. 9, showing the processing steps for compression and expansion of an image block A having a high amplitude image detail. Comparing the local normalization factors of block C in FIG. 10 with the global normalization factors of block D in FIG. 9, it can be appreciated that the block adaptive normalization method of the present invention will provide significantly further compression of the image.

Figure 11:
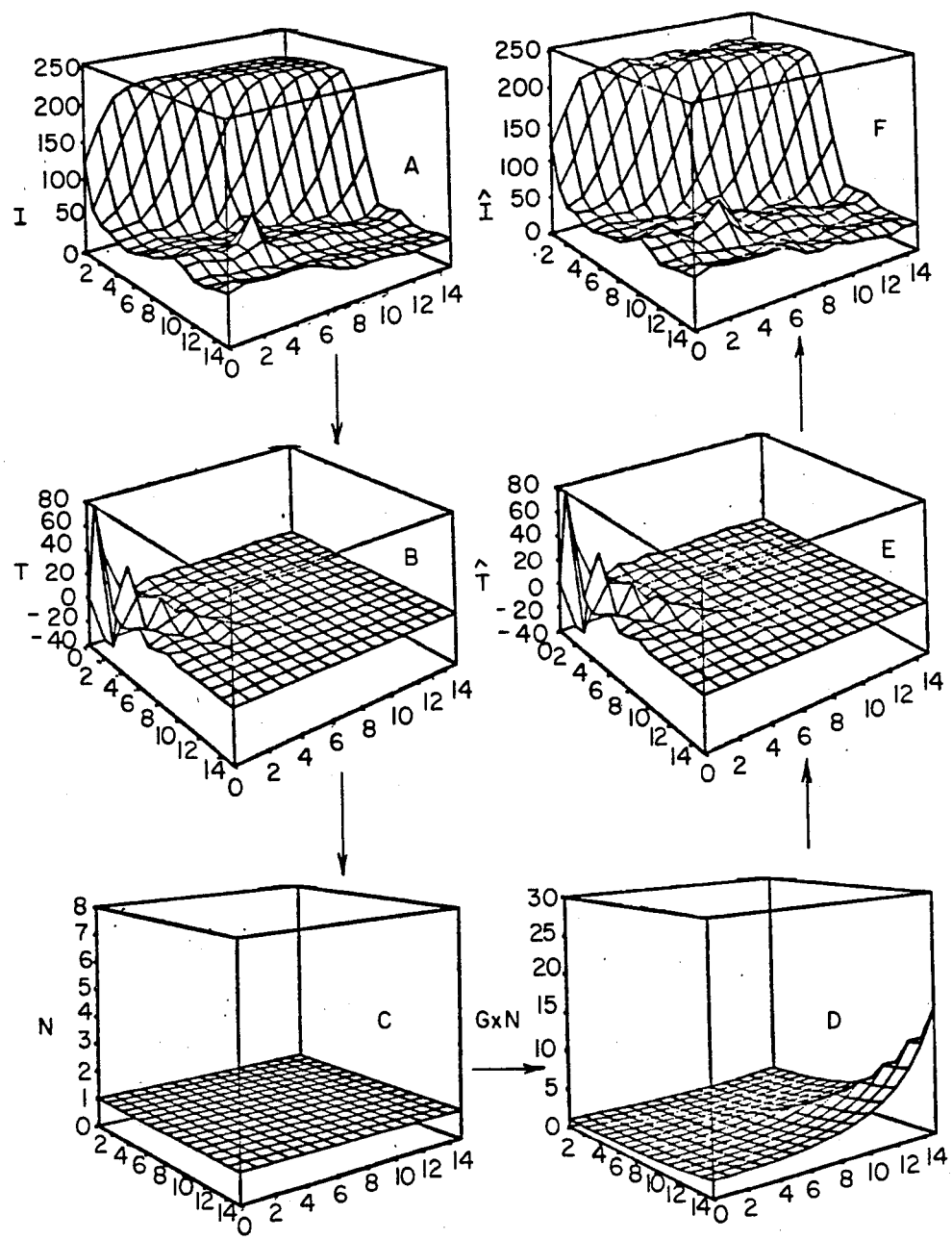
FIG. 11 is a set of graphs similar to those shown in FIGS. 9 and 10 showing a block having a high contrast edge.

FIG. 11 is a group of plots similar to FIGS. 9 and 10 showing an image block A having a high amplitude edge. The presence of the edge resulted in high amplitude, low frequency coefficients as seen in block B. The presence of the edge was detected, and the local normalization (factors block C) were all set equal to one.

A large variety of images were compressed and reconstructed according to the present invention. On the average, a 15 percent improvement in compression ratio was achieved by the block adaptive normalization technique.

Although the present invention has been described with reference to a monochromatic digital image, it will be readily apparent that the technique described can also be applied to a color digital image, for example by separating the image into a luminance component and chrominance component, and applying the block adaptive normalization technique to the luminance component. Generally, since the chrominance component is of lower resolution than the luminance component, the gains to be made by applying the more sophisticated compression techniques (of which the present invention is an example) to the chrominance component do not justify the added complexity. However, the present inventors have achieved excellent results in compressing color digital images by separating the images into a luminance component and two lower resolution chrominance components, and applying the block adaptive transform technique to the luminance components, and the DCT transform without block adaptive feature to the chrominance components.

Industrial Applicability and Advantages

The present invention is useful in digital image transmission systems for transmitting a digital image over a narrow-band communication channel. The invention produces improved compression of the digital image without introducing visible artifacts, thereby enabling improvements in image quality for the same transmission time, or faster transmission times for the same quality of image, or allowing the use of narrower bandwidth communication channels for the same transmission time and image quality.

We claim:

1. A transmitter for compressing and transmitting a digital image over a limited bandwidth communication channel, comprising:
    a. means for performing a two-dimensional spatial frequency block transformation on the digital image to produce blocks of transform coefficients;
    b. means for quantizing the transform coefficients in accordance with a model of the visibility of quantization error in the presence of image detail;
    c. means for encoding the quantized transformation coefficients with a minimum redundancy code; and
    d. means for transmitting the encoded transform coefficients.

2. The transmitter claimed in claim 1, wherein said means for quantizing the transform coefficients, comprises:
    a. means for normalizing the coefficients in accordance with a model of the visibility of quantization errors in the presence of image detail; and
    b. means for quantizing the normalized coefficients.

3. The transmitter claimed in claim 1, further including means for globally quantizing the transform coefficients based on a model of the human visual response to the spatial frequencies represented by the transform coefficients.

4. The transmitter claimed in claim 1, wherein said means for quantizing transform coefficients, comprises;
    a. means for arranging the coefficients from a block into a one-dimensional array in order of decreasing spatial frequency; and
    b. means for sequentially quantizing the coefficients in the array, starting with the coefficient representing the lowest frequency including:
    (1) means for forming an estimate of the contrast of the image structure in the block from the previous coefficient values in the array; and
    (2) means for determining the quantization for the current coefficient as a function of the contrast estimate, said function relating the contrast estimate to the visibility of quantization error in the presence of image detail having such contrast.

5. The transmitter claimed in claim 4, wherein the previous coefficients employed to form an estimate of the contrast of the image detail are the quantized coefficients, whereby the quantization values may be recovered from the quantized signal value at a receiver without error.

6. The transmitter claimed in claim 4, wherein said means for sequentially quantizing provides a predetermined quantization for the first m coefficients.

7. The transmitter claimed in claim 6 wherein said means for sequentially quantizing the coefficients includes means for detecting the presence of an edge separating uniform image areas in the block, and means for providing a predetermined quantization for all the coefficients in the array when such an edge is detected.

8. A method for compressing a digital image for transmission over a limited bandwidth communication channel, comprising the steps of:
   a. performing a two-dimensional spatial frequency block transformation on the digital image to produce blocks of transform coefficients;
   b. quantizing the transform coefficients in accordance with a model of the visibility of quantization error in the presence of image detail; and
   c. encoding the quantized transformation coefficients employing a minimum redundancy code.

9. The method claimed in claim 8, wherein said step of quantizing the transform coefficients, comprises the steps of:
   a. normalizing the coefficients in accordance with a model of the visibility of quantization errors in the presence of image detail; and
   b. quantizing the normalized coefficients.

10. The method claimed in claim 8, further including globally quantizing the transform coefficients based on a model of the human visual response to the spatial frequencies represented by the transform coefficients.

11. The method claimed in claim 8, wherein said step quantizing transform coefficients, comprises the steps of:
   a. arranging the coefficients from a block into a one-dimensional array in order of increasing spatial frequency; and
   b. sequentially quantizing the coefficients in the array, starting with the coefficient representing the lowest frequency including the steps of:
      (1) forming an estimate of the contrast of the image structure in the block from the previous coefficient values in the array; and
      (2) determining the quantization for the current coefficient as a function of the contrast estimate, said function relating the contrast estimate to the visibility of quantization error in the presence of image detail having such contrast.

12. The method claimed in claim 11, wherein the previous coefficients employed to form an estimate of the contrast of the image detail are the quantized coefficients, whereby the quantization values may be recovered from the quantized signal value at a receiver without error.

13. The method claimed in claim 11, wherein said steps of sequentially quantizes the first m coefficients with a predetermined step size.

14. The method claimed in claim 13 wherein said step of sequentially quantizing the coefficients includes detecting the presence of an edge separating uniform image areas in the block, and quantizing for all the coefficients in the array with a predetermined step size when such an edge is detected.

* * * * *